June 8, 1965  E. PEKRUL  3,188,149
LOAD-ADJUSTED RELAY VALVE DEVICE FOR BRAKE CONTROL SYSTEMS
Filed Nov. 1, 1962
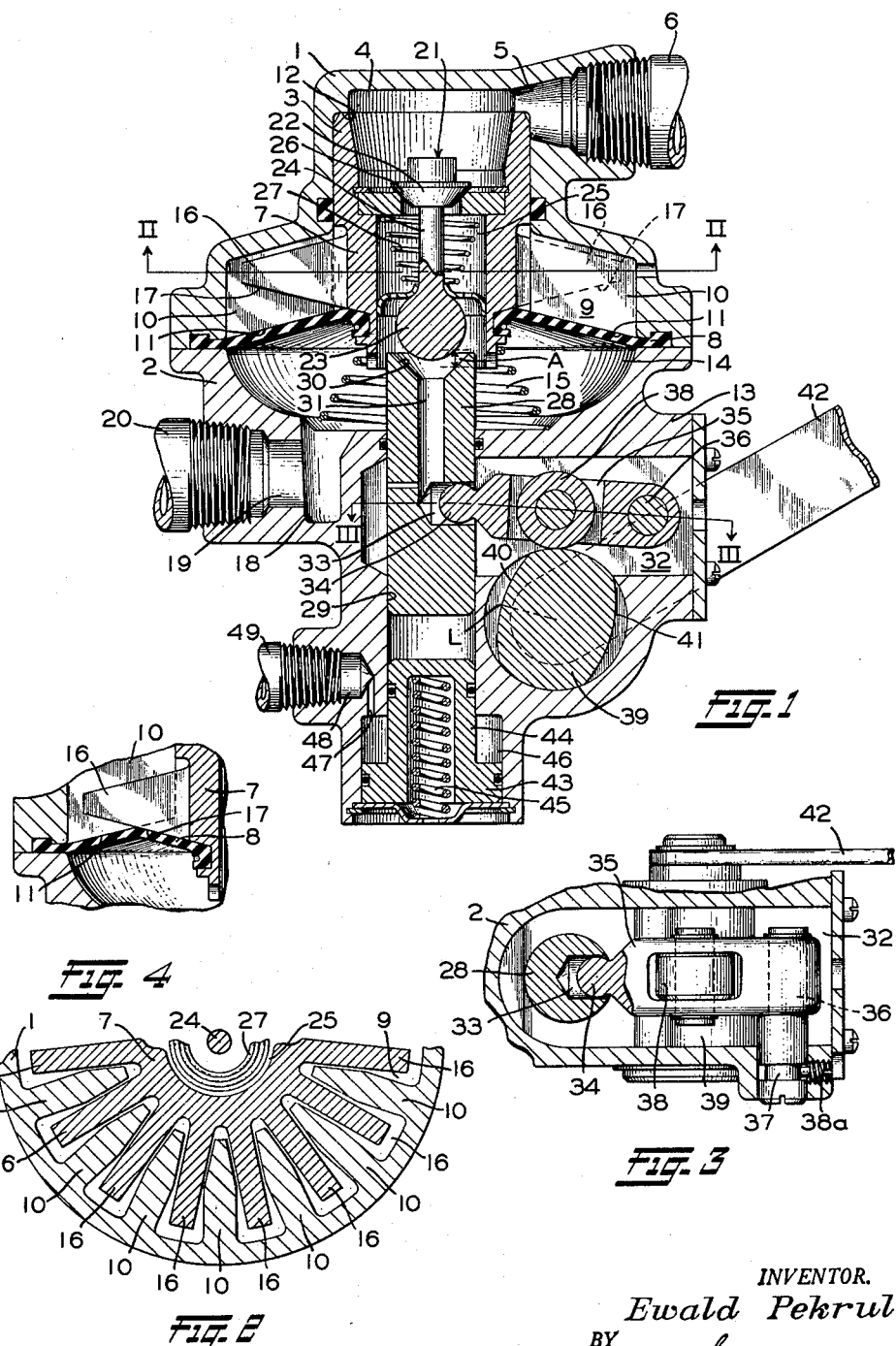
INVENTOR.
Ewald Pekrul
BY
A. A. Steinmiller
Attorney 3,188,149
LOAD-ADJUSTED RELAY VALVE DEVICE
FOR BRAKE CONTROL SYSTEMS
Ewald Pekrul, Hannover, Germany, assignor to Westinghouse Bremsen-Gesellschaft, m.b.H., Hannover, Germany
Filed Nov. 1, 1962, Ser. No. 234,810
Claims priority, application Germany, Nov. 4, 1961, W 31,002
4 Claims. (Cl. 303—22)

This invention relates to load-adjusted relay valve devices for brake control systems and, more specifically, to such a relay valve device characterized by a variable area diaphragm, valve means operable thereby for causing pressurized actuating fluid to be delivered to the brake cylinder proportionate to the load on the vehicle and means operatively connecting the relay valve device to the sprung portion of the vehicle whereby the effective area of said diaphragm is adjusted according to the deflection of the sprung portion of the vehicle caused by the load thereon. Thus, the braking force applied to the vehicle wheels is proportionate to the load.

Some of the presently known load-adjusted relay valve devices having variable area diaphragms are characterized by a radially movable support for the diaphragm for varying the effective area, or a rigid conforming support from which the diaphragm is peeled or against which it rolled for varying the effective area. These arrangements may be found to be undesirable in that the diaphragm, not always totally supported when the radial supports are retracted or when the diaphragm is peeled from its conforming support, must be constructed of heavier material to withstand the greater stresses placed on the unsupported portions and hence offer greater resistance to movement, which makes them less sensitive and efficient in operation.

Accordingly, the purpose of the present invention is to provide a load-adjusted relay valve device characterized by a variable effective area diaphragm piston, substantially the entire area of which is supported at all times notwithstanding any variation in the effective area thereof. Briefly, the invention comprises a flexible diaphragm having its outer periphery clamped in a fixed position between outer peripheral and mating edges of two casing sections while the inner periphery of said diaphragm is clamped in sealing relation to a cylindrical follower stem of an operating piston, which is subjected to actuating fluid pressure in a pressure chamber when a brake application is effected. Substantially, the entire area on one side of the diaphragm, in its normal position, is supported by a plurality of uniformly angularly spaced and fixed ribs extending radially inwardly from the casing toward the follower stem, and by a second plurality of uniformly angularly spaced movable ribs to the follower stem of the operating piston, said movable ribs being movable with the follower stem and extending radially therefrom toward the casing wall in interspaced relation between said fixed ribs. The relay valve device further comprises a supply and exhaust valve connected to each other by a stem, whereby, upon supply of actuating fluid pressure to the pressure chamber, the operating piston is moved axially to cause seating of the exhaust valve first and then unseating of the supply valve to cause pressurized fluid to flow from the pressure chamber to a delivery chamber. Axial movement of the operating piston causes the movable ribs to peel off the diaphragm from the fixed ribs until fluid pressure in the delivery chamber is proportional to that in the pressure chamber according to the ratio of the pressure area (which is constant) of the operating piston to the effective axial movement of said operating piston, which, in turn, is defined by seating of the exhaust valve on a positionally adjustable exhaust valve seat. The position of the exhaust valve seat is adjusted by a lever operated by deflection of the sprung portion of the vehicle according to the vehicle load.

In the drawing, FIG. 1 is a sectional view of a load-adjusted relay valve device embodying the invention; FIG. 2 is a sectional view taken along line II—II of FIG. 1 in the direction indicated by the arrows; FIG. 3 is a sectional view taken along line III—III of FIG. 1 in the direction indicated by the arrows; and FIG. 4 is a fragmentary view of a portion of the valve device shown in FIG. 1 with certain components in a different position.

DESCRIPTION AND OPERATION

As shown in FIG. 1, a load-adjusted relay valve device embodying the invention comprises upper and lower casing sections 1 and 2, respectively, as viewed in FIG. 1 of the drawing. An operating piston 3 is operably disposed in upper casing section 2, said operating piston having a pressure side subjectable to actuating fluid pressure in an inlet chamber 4 formed adjacent thereto in said upper casing section, said pressure chamber having an inlet port 5 opening thereinto. The inlet port 5 is connected by a pipe 6 to a source (not shown) of actuating pressurized fluid which is supplied automatically (in a manner not deemed essential to an understanding of the invention) to the inlet chamber 4, via pipe 6 and port 5, when the brake apparatus is actuated for effecting a brake application.

The operating piston 3 is provided with a coaxially disposed hollow cylindrical follower stem 7 around the lower end of which, as viewed in FIG. 1 of the drawing, the inner periphery of a flexible diaphragm 8 is secured in sealing relation thereto, while the outer periphery of said diaphragm is sealingly secured between the casing sections 1 and 2 in such manner as to provide an atmospheric chamber 9 formed in the upper casing section 1 between the operating piston 3 and said diaphragms.

Each of a plurality of uniformly angularly spaced stationary ribs 10, vertically disposed in atmospheric chamber 9, extends radially from the vertical internal surface of casing section 1 to terminate short of contact with the follower stem 7 (see FIG. 2), the bottom surface, as viewed in FIG. 1 of the drawing, of each of said ribs being formed at a uniform angle relative to the axis of said follower stem so as to jointly provide a concave dish-like or conical surface 11, interrupted by the spaces between the ribs, against which conical surface the diaphragm 8 rests when in a normal position as determined by a normal position of operating piston 3 defined by abutment of said piston with a shoulder 12 formed in upper casing section 1. A horizontal wall 13 formed in the lower casing section 2 cooperates with said lower casing section and the diaphragm 8 to define a control chamber 14 in which a spring 15 is compressed between said wall and the lower end of follower stem 7 for biasing said follower stem, said diaphragm and the operating piston 3 toward respective normal positions above defined. A second plurality of uniformly angularly spaced movable ribs 16 are also disposed in chamber 9 between each of the ribs 10, said movable ribs being movable with the follower stem 7 and extending radially therefrom to terminate short of contact with the vertical wall of casing section 1 from which the ribs 10 project, as shown in FIG. 2. The bottom surfaces, as viewed in FIG. 1 of the drawing, of each of the ribs 16 are formed at a uniform angle relative to the axis of the follower stem 7 and in intersecting relation to the angle of ribs 10, said ribs 16 thus forming a dish-like or conical surface 17, interrupted by the spaces between the ribs, which conical surface is totally out of contact with diaphragm 8 when piston 3 and follower stem 7 are in their respective normal positions.

Thus, when piston 3 and diaphragm 8 are in their respective normal positions, the atmospheric side of said diaphragm adjacent atmospheric chamber 9 rests against conical surface 11, which, in effect, provides a substantially solid fixed surface coinciding with substantially the entire atmospheric side of said diaphragm. With the diaphragm 8 in its normal position, therefore, the effective pressure area subjectable to fluid pressure in control chamber 14 is negligible, and for purposes of describing the invention will be considered as zero area.

Control chamber 14 is open to a delivery or outlet chamber 18 to which a delivery port 19 is open, said delivery port being connected by a pipe 20 to the brake cylinder devices (not shown) to which fluid at a pressure according to and determined by the degree of vehicle load is delivered in a manner to be more fully described hereinafter.

A tandem valve assemblage 21 comprising a supply valve 22 and an exhaust valve 23 connected to each other in fixed spaced relation by a valve stem 24, is operably disposed in an axially formed passageway 25 extending through the follower stem 7. The operating piston 3 is provided with an annular valve seat 26 surrounding one end of passageway 25 adjacent inlet chamber 4, the supply valve 22 being urged by a spring 27 toward a seated position on said valve seat, in which seated position communication between chambers 4 and 18 via said passageway is cut off. An exhaust valve seat member 28 is slidably disposed in a bore 29 formed in lower casing section 2 in axial alignment with the valve assemblage 21. An annular valve seat 30 is formed at one end of valve seat member 28 adjacent exhaust valve 23 in surrounding relation to one end of a coaxial passageway 31 formed in said valve seat member and open to atmosphere via a recess 32 formed in lower casing section 2.

In considering the operation of the load-adjusted relay valve device embodying the invention and above described, let it be assumed that the exhaust valve seat member 28 occupies a position as shown in the drawing, in which position valve seal 30 is axially spaced away from exhaust valve 23, which, it may be said, is thus occupying an unseated or open position relative to said valve seat. In the open position of exhaust valve 23, chamber 14 is vented to atmosphere past said valve via passageway 31 and recess 32. Let it further be assumed that the operator of the vehicle has operated his controls (not shown) for initiating a brake application on the vehicle. With such initiation of a brake application, fluid at a pressure sufficient for overcoming the biasing effect of spring 15 and adequate for a brake application of maximum magnitude is supplied to inlet chamber 4 of the relay valve device to act on piston 3, which is thereby caused to move downwardly, as viewed in FIG. 1 of the drawing, out of its normal position, the valve assemblage 21 moving therewith, until exhaust valve 23 seats on valve seat 30 in a closed position. With exhaust valve 23 seated on valve seat 30 in its closed position, chamber 14 is closed to atmosphere and downward movement of the valve assemblage 21 is terminated while piston 3 continues to move downwardly in response to fluid pressure in chamber 4, said further downward movement of piston 3 causing valve seat 26 to move away from supply valve 22 which thereby occupies an unseated or open position relative to valve seat 26.

With supply valve 22 in its open position, fluid under pressure flows past said unseated supply valve to control chamber 14 via passageway 25. As was above noted, as long as diaphragm 8 rests entirely against surface 11 of the fixed ribs 10, the effective pressure area of said diaphragm relative to fluid pressure in chamber 14 acting thereon may be considered to be zero. It should be evident, however, that as piston 3 moves downwardly from its normal position, the movable ribs 16 are carried with said piston, and in so moving the surface 17 of said movable ribs peels the diaphragm 8 from surface 11 of the fixed ribs 10 to thereby provide an effective area defined as that area of diaphragm 8 resting on surface 17 and against which fluid pressure in chamber 14 acts in opposition to fluid pressure in chamber 4 acting on piston 3. Downward movement of piston 3 continues until enough of the diaphragm 8 has been peeled from surface 11 to provide a pressure area on which fluid pressure in chamber 14 is effective to establish a force equal to the force provided by fluid pressure in chamber 4 acting on piston 3. When the opposing forces acting on opposite sides of diaphragm 8 are thus equalized, piston 3 assumes a lapped position in which both the supply valve 22 and exhaust valve 23 are seated on the respective valve seats 26 and 30 for maintaining the degree of fluid pressure in chamber 14, and therefore of the fluid delivered via delivery chamber 18, port 19 and pipe 20 to the brake cylinder device (not shown), at that degree determined by the axial position of valve seat member 28 relative to the valve assemblage 21 when piston 3 is in its normal position. The axial position of the valve seat member 28 determines the axial distance between the valve seat 30 and exhaust valve 23 (said axial distance being designated "A" in FIG. 1 of the drawing) and, therefore, the axial distance which piston 3 must travel out of its normal position before exhaust valve 23 seats on valve seat 30 for effecting consequent equalization of opposing forces acting on opposite sides of diaphragm 8 by lapping of the valve assemblage 21. In turn, the axial distance through which piston 3 moves, or distance A, determines the amount of area of diaphragm 8 picked up by surface 17 from surface 11 and, therefore, the degree of pressure delivered to the brake cylinders, as above explained. It should be apparent, therefore, that the greater distance A is, the lesser will be the degree of pressure delivered to the brake cylinders for effecting a brake application accordingly. Expressed in proportional terms, it can be said that the degree of fluid pressure established in delivery chamber 18 is to the degree of fluid pressure in chamber 4 as the area of piston 3 is to the established effective area of diaphragm 8.

The axial position of valve seat member 28 in bore 29, as was above indicated, is determined by vehicle load. The valve seat member 28 is provided, on the side adjacent recess 32, with a recess 33 in which a rounded end 34 of a positioning lever 35 is engaged, said lever being pivotally supported at the end opposite said rounded end by an eccentric extension 36 of a pin 37 adjustably supported by housing section 2 so as to permit pivoting action of said lever in a plane coinciding with the axis of said valve seat member. Lever 35 is pivotable about the axis of the eccentric extension 36 of pin 37. The pin 37 is angularly adjustable in the casing section 2 in order that the axis of the eccentric extension 36, which is the pivotal axis of lever 35, may be properly positioned to provide the desired operative relationship between a cam follower or roller 38, rotatably carried by lever 35, and a camshaft 39. The camshaft 39 is rotatably supported by casing section 2, and, for a purpose to be hereinafter disclosed, is provided with two cam surfaces 40 and 41 formed on opposite sides of camshaft 39 at a 180° relationship. A set screw 38a is provided for locking pin 37 in its adjusted position (see FIG. 3).

The load-adjusted relay valve device embodying the invention is adapted to be mounted on the sprung portion (not shown) of the vehicle with its axis vertically disposed. Rotation of camshaft 39 is effected by spring deflection between the sprung portion and the unsprung portion (not shown) resulting from a load placed on the vehicle. One end of a lever 42 is keyed to an extension formed on one end of camshaft 39, the other end of said lever being connected, through linkage not shown, to the unsprung portion of the vehicle. Thus, a decrease in vehicle load causes the relay valve device (mounted on the sprung portion) to be elevated relative to the unsprung portion of the vehicle, which results in a clockwise rotation of lever 42 and therefore of camshaft 39, as viewed in the drawing and relative to said relay valve device, so that the cam roller 38 takes a position on the cam surface 40 in accordance with the degree of vehicle load. The camshaft 39, therefore, is angularly displaced an amount corresponding to the amount of rotation of lever 42 and is so arranged that with an empty-load vehicle the roller 38 is in contact with the lowest point, designated "L" in the drawing, of the cam surface 40 to thereby effect axial adjustment of valve seat member 28 to provide maximum distance A between valve 22 and valve seat 30. Movement of vale seat member 28 to maximum distance A is effected by fluid pressure in chamber 14 acting on the upper end of said valve seat member adjacent valve seat 30 when exhaust valve 23 is seated thereon and supply valve 22 is opened. Maximum distance A, therefore, permits maximum travel of piston 3 before exhaust valve 23 seats on valve seat 30 which results in maximum effective area of diaphragm 8 by peeling from surface 11 to surface 17, which, in turn, results in delivery of fluid at minimum pressure to the brake cylinders, as above explained, for braking the empty vehicle.

Of course, axial adjustment of valve seat member 28 upwardly for decreasing distance A is effected when a load is placed on the vehicle to cause counterclockwise rotation of lever 42 and camshaft 39 relative to the relay valve device, the degree of such rotation depending on the degree of the load. Roller 38 rides up cam surface 40 to a higher point, and in doing forces lever 35 to be pivoted in a clockwise direction, as viewed in the drawing, to effect axial adjustment upwardly of the valve seat member 28 and, therefore, a corresponding decrease of distance A. As was above explained, a decrease in distance A effects a corresponding increase in the degree of pressure of fluid delivered to the brake cylinders.

Due to varying types of vehicle suspension systems, a given load may cause a certain amount of spring deflection between the sprung and unsprung portions of one vehicle while causing a different amount of such deflection on another vehicle. In order that the load-adjusted relay valve device embodying the invention may be adapted for use on various vehicles with differing spring deflection characteristics, the two cam surfaces 40 and 41, each having its particularly designed contour, are provided, in addition to the adjustable pin 37, above described. The camshaft 39 is connected to lever 42 in such manner that, of the two cam surfaces 40 and 41, the one more suitable to the particular spring deflection characteristics of the vehicle, on which the device is to be mounted, may be placed in operative position for contact with roller 38, thereby insuring proper positioning of the valve seat member 28 according to vehicle load. To change from one cam surface to the other, such as from cam surface 40 to cam surface 41, it is merely necessary to disconnect the end of lever 42 from the extension end of camshaft 39, rotate said camshaft 180°, and relock said lever on the extension end of the camshaft.

The load-adjusted relay valve device above described is further characterized by a safety feature which acts to prevent reduced fluid pressure delivery to the brake cylinders with a relatively heavy load on the vehicle should the available fluid for actuating the brakes drop to a critical pressure such as sixty percent of normal, for example. This safety feature comprises a lockout piston 43 disposed in the lower extremity of lower casing section 2 in axial alignment with the valve seat member 28.

Lockout piston 43 is provided with a piston stem 44 extending into bore 29, said piston and stem being constantly biased by a spring 45 toward the lower end, as viewed in the drawing, of valve seat member 28. The biasing force of spring 45 is of a predetermined value such that, upon reduction of fluid pressure in a control chamber 46 below a certain critical value and acting on lockout piston 43 in opposing relation to said biasing force, said spring is effective for moving said lockout piston out of a non-locking position, in which piston stem 44 is spaced apart from the adjacent end of valve seat member 28, to a lockout position in which said piston stem abuts against said adjacent end of said valve seat member to thereby prevent downward axial displacement of said valve seat member until said fluid pressure in said control chamber has been restored to a value above said critical value. In other words, it maintains valve seat member 28 in a position in which distance A is a minimum setting.

Control chamber 46 is open, via a passageway 47, to a port 48 formed in the casing, said port and therefore said chamber, being connected by a pipe 49 to the source (not shown) of fluid under pressure from which pressurized fluid is supplied to pressure chamber 4 and eventually to the brake cylinders. As long as fluid pressure in chamber 46, therefore, remains at a pressure above the critical pressure of sixty percent of normal, lockout piston 43 will remain in its non-locking position, in which it is shown, and the load-adjusted relay valve device operates in the manner above described to deliver fluid to the brake cylinder at a pressure corresponding to vehicle load. But should fluid pressure in chamber 46 drop below the critical value, the lockout piston 43 operates, as above described, to its lockout position for maintaining distance A between exhaust valve 23 and valve seat 30 to a minimum for assuring delivery of fluid at maximum available pressure at the time.

Having now described the invention, what I claim as new and desire to secure by Letters Patent, is:

1. A fluid pressure regulating valve device comprising:
   (a) a casing having an inlet pressure chamber to which a control pressure may be supplied and an outlet pressure chamber from which fluid pressure is supplied for a desired control purpose,
   (b) a constant area piston having a hollow stem and subject on one side to the fluid pressure in said inlet pressure chamber,
   (c) a variable area diaphragm connected at its inner area to said piston stem and at its outer periphery to said casing and being subject on one side to the pressure in said outlet pressure chamber,
   (d) a valve stem coaxially carried by said piston and having:
      (i) a supply valve at one end which is biased to a seated position on a valve seat on said piston to close communication therepast between said inlet pressure chamber and said outlet pressure chamber, and
      (ii) an exhaust valve at the opposite end thereof,
   (e) a tubular exhaust valve seat member having a valve seat at one end on which said exhaust valve seats to close communication between said outlet pressure chamber and atmosphere via a passage in said tubular exhaust valve seat member,
   (f) a lever having one end pivotally supported on said casing and a free end thereof operatively connected to said exhaust valve seat member for axially shifting said exhaust valve seat member to different positions to vary the normal clearance between said exhaust valve and said exhaust valve seat,
   (g) rotary cam means for operatively pivoting said lever for effecting shifting of said exhaust valve seat member to its said different positions,
   (h) means for rotating said rotary cam means for effecting pivoting of said lever in accordance with variations in vehicle load,
   (i) said constant area piston being effective responsively to supply of fluid pressure to said inlet pressure chamber to move the inner area of said diaphragm to provide an increasingly larger effective pressure area to a limit determined by sealing engagement of said exhaust valve on said exhaust valve seat, thereby to effect unseating of said supply valve correspondingly to cause supply of fluid pressure past said supply valve from said inlet pressure chamber to said outlet pressure chamber, the pressure established therein acting on said diaphragm to effect reseating of said supply valve on said piston by return movement of said piston and corresponding to the position of said exhaust valve seat member,
(j) a plurality of angularly spaced radially extending ribs carried by said casing and supporting said diaphragm against deflection by the pressure in said outlet chamber, and
(k) a plurality of angularly spaced ribs carried by said piston in interspersed radial relation to the aforesaid ribs carried by said casing and effective to peel off the inner area of the diaphragm to provide the increasingly greater effective area of the diaphragm in accordance with movement of said piston when subject to the pressure in the inlet pressure chamber.

2. A fluid pressure regulating valve device as claimed in claim 1, further characterized in that said cam means is provided with a plurality of different cam surfaces corresponding respectively to different vehicle load deflection characteristics.

3. A fluid pressure regulating valve device as claimed in claim 1, further characterized in that the means pivotally supporting one end of said lever on said casing is a pin carried eccentrically on a rotary shaft to vary the pivotal axis of said lever as said rotary shaft is rotated.

4. A fluid pressure regulating valve device comprising:
(a) a casing having an inlet pressure chamber to which a control pressure may be supplied and an outlet pressure chamber from which fluid pressure is supplied for a desired control purpose,
(b) a constant area piston having a hollow stem and subject on one side to the fluid pressure in said inlet pressure chamber,
(c) a variable area diaphragm connected at its inner area to said piston stem and at its outer periphery to said casing and being subject on one side to the pressure in said outlet pressure chamber,
(d) a valve stem coaxially carried by said piston and having:
   (i) a supply valve at one end which is biased to a seated position on a valve seat on said piston to close communication therepast between said inlet pressure chamber and said outlet pressure chamber, and
   (ii) an exhaust valve at the opposite end thereof,
(e) a tubular exhaust valve seat member having a valve seat at one end on which said exhaust valve seats to close communication between said outlet pressure chamber and atmosphere via a passage in said tubular exhaust valve seat member,
(f) means for shifting said exhaust valve seat member axially to different positions to vary the normal clearance between the said exhaust valve and said exhaust valve seat,
(g) said constant area piston being effective responsively to supply of fluid pressure to said inlet pressure chamber to move the inner area of said diaphragm to provide an increasingly larger effective pressure area to a limit determined by sealing engagement of said exhaust valve on said exhaust valve seat, thereby to effect unseating of said supply valve correspondingly to cause supply of fluid pressure past said supply valve from said inlet pressure chamber to said outlet pressure chamber, the pressure established therein acting on said diaphragm to effect reseating of said supply valve on said piston by return movement of said piston and corresponding to the position of said exhaust valve seat member, and
(h) a second piston subject opposingly to the force of a spring and a pressure corresponding to the pressure in said pressure inlet chamber, and effective when the inlet chamber pressure reduces below a certain value to be moved by said spring to a position engaging the said exhaust valve seat member and restraining movement thereof out of a position providing a maximum outlet pressure in said outlet chamber.

References Cited by the Examiner
UNITED STATES PATENTS

| | | | |
|---|---|---|---|
| 2,986,427 | 5/61 | McClure et al. | 303—60 X |
| 3,011,833 | 12/61 | Stelzer | 303—22 X |
| 3,018,136 | 1/62 | Williams | 303—60 X |
| 3,125,379 | 3/64 | Valentine | 303—22 X |

EUGENE G. BOTZ, *Primary Examiner.*
ARTHUR L. LA POINT, *Examiner.*